United States Patent [19]

Wakana et al.

[11] 4,241,100

[45] Dec. 23, 1980

[54] PROCESS FOR PRODUCING SOYBEAN MILK

[75] Inventors: Teruo Wakana, Hidaka; Kunio Okubo, Ogose; Yutaka Hanaoka, Akishima, all of Japan

[73] Assignee: Kibun Co., Ltd., Tokyo, Japan

[21] Appl. No.: 941,408

[22] Filed: Sep. 11, 1978

Related U.S. Application Data

[63] Continuation-in-part of Ser. No. 704,920, Jul. 13, 1976, abandoned.

[30] Foreign Application Priority Data

Jul. 21, 1975 [JP] Japan .................................. 50/88441

[51] Int. Cl.³ ............................................... A23L 2/38
[52] U.S. Cl. ................................................. 426/598
[58] Field of Search ............... 426/598, 634, 489, 430, 426/431, 508

[56] References Cited

U.S. PATENT DOCUMENTS

| | | | |
|---|---|---|---|
| 1,088,741 | 3/1914 | Stephens | 426/634 |
| 1,165,199 | 12/1915 | Monahan et al. | 426/431 X |
| 1,273,145 | 7/1918 | Burdiek et al. | 426/598 |
| 1,359,633 | 11/1920 | Thévenot | 426/598 X |
| 2,329,080 | 9/1943 | Raymond | 426/634 X |
| 3,288,614 | 11/1966 | Miles | 426/598 X |
| 3,901,978 | 8/1975 | Nelson et al. | 426/598 X |
| 4,039,696 | 8/1977 | Marquardt et al. | 426/598 |
| 4,041,187 | 8/1977 | Nelson et al. | 426/634 X |

OTHER PUBLICATIONS

Nelson et al., *J. of Food Sci.*, 41, (1976), 57–61.

*Primary Examiner*—Esther M. Kepplinger
*Attorney, Agent, or Firm*—Browdy and Neimark

[57] ABSTRACT

A process for producing soybean milk without undesirable beany flavor or bitterness and giving soft and pleasant feel to the tongue, which comprises cooking unsoaked soybeans in an aqueous medium for as short a period as practicable, grinding the boiled soybeans while bringing them into contact with a sodium bicarbonate aqueous solution at a relatively high temperature, extracting the soyprotein and other water soluble components from the ground soybeans and removing a substantial amount of the solids from the slurry.

2 Claims, No Drawings

PROCESS FOR PRODUCING SOYBEAN MILK

CROSS REFERENCE TO RELATED APPLICATIONS

This application is a continuation-in-part of copending application Ser. No. 704,920, filed on July 13, 1976, now abandoned claiming a Convention-priority on the basis of Japanese Pat. Application No. 88441/1975 filed on July 21, 1975.

BACKGROUND OF THE INVENTION

This invention relates to a process for producing soybean milk giving a soft and pleasant feel to the tongue and having no undesirable beany or painty flavor or bitterness and, particularly, it relates to a process for producing soybean milk having such properties as described above, which comprises cooking soybeans in an aqueous medium, grinding the boiled soybeans into slurry while contacting them with an aqueous sodium bicarbonate, extracting the soyprotein and other water-soluble components from the ground soybeans and removing at least the major amount of solids from the slurry to give the desired soybean milk.

Some processes for preparing soybean milk have been reported. For example, U.S. Pat. No. 3,901,978 issued to A. I. Nelson et al. on Aug. 26, 1975 discloses a process for preparing a bland, stable aqueous dispersion of whole soybeans. However, the main purpose of such process is to reduce undesirable beany flavor or painty flavor, and the soft or pleasant feel given by the soybean milk to the tongue is not sufficiently improved.

Such process comprises adequately tenderizing soybeans by swelling and, heating them sufficiently to inactivate the lipoxidase enzyme contained therein, grinding them into a slurry, homogenizing the slurry and recovering an aqueous dispersion of whole soybeans. The resulting dispersion is relatively poor in soft and pleasant feel to the tongue because no solid particles are removed from the dispersion even if the slurry has been homogenized into a dispersion of finely divided particles dispersed in the aqueous medium.

U.S. Pat. No. 4,041,187 issued on Aug. 9, 1977, which is a continuation-in-part application of the above patent discloses a process for preparing an aqueous dispersion of soybeans which comprises heating soybeans sufficiently to inactivate lipoxidase enzyme contained therein, further tenderizing said soybeans to a predetermined degree and, after forming a slurry of the tenderized soybeans, homogenizing the slurry to obtain a soybean dispersion. The soybean dispersion prepared according to the process of the latter patent also feels relatively rough to the tongue because substantially no solids are removed and solid particles remain in the dispersion even if the slurry containing ground soybeans is homogenized. To promote the subsequent homogenization in the practice of such process, the soybeans must be sufficiently tenderized by boiling them for a long period of time. Although in this case the homogenization is effectively accomplished, the product still feels rough to the tongue because of the remaining solid soybean particles.

The latter U.S. Patent also discloses the cause of the undesirable flavor and odor as follows. The undesirable flavor and odor are principally caused by an enzyme system, lipoxidase, which catalyzes the oxidation of the polyunsaturated oils and fats in the soybeans. The reaction can take place quickly whenever: (1) the bean cell structure is damaged, as when the bean cotyledons are bruised, cracked or ground, so that the enzyme and oil are permitted to contact each other, and (2) a certain amount of water is present. As little as one part in one billion of the oxidized reaction product can be detected organoleptically and, for this reason, it is difficult and expensive to remove sufficient reaction product to impart a bland taste to the resulting beverage. Thus, it is extremely desirable to prevent the formation of such reaction product.

For these reasons, soybean milk produced by the prior art methods has been undesirable for use as a beverage or as beverage base and, therefore, it has been used as a raw material for other food products.

From their study and research relating to production of soybean milk having the above mentioned properties, they found the following facts:

1. Undesirable beany flavor can be removed by cooking the soybeans in an aqueous medium;

2. Even if the cooking time is not long enough to completely deactivate lipoxidase, the undesirable flavor can be completely removed by grinding the cooked soybeans while bringing them into contact with an aqueous medium at a temperature above 80° C.;

3. If the cooking is effected in a short period of time, the insolubilization level of water soluble components, especially water soluble protein, can be significantly reduced;

4. Bitterness can be removed by grinding the cooked soybeans in the presence of sodium bicarbonate.

In accordance with these facts, the inventors continued their study and research and completed this invention.

SUMMARY OF THE INVENTION

In order to obtain soybean milk which gives a soft and pleasant feel to the tongue and does not have undesirable beany or painty flavor and bitterness, the inventors selected an approach in which the solids which feel rough to the tongue are removed from an aqueous slurry of the finely ground soybeans. In using this approach, the inventors encountered a problem in that, when removing the solids from the slurry, a substantial amount of nutritious components were also removed from the slurry. The inventors focused their study on this point and, at last, succeeded in obtaining a highly nutritious soybean milk, giving a soft or pleasant feel to the tongue, and having no undesirable beany or painty flavor or odor.

Thus, one purpose of this invention is to provide a process for producing soybean milk having the above-mentioned excellent properties. Especially, the purpose is to provide soybean milk which gives a soft and pleasant feel to the tongue by removing solids from the aqueous slurry of finely ground soybeans and which is rich in water soluble protein as a nutritious component, by reducing the amount of protein removed when the solids are removed.

DETAILED DESCRIPTION OF THE DISCLOSURE

The process of this invention comprises:

(a) Unsoaked soybeans are cooked in an aqueous medium at boiling temperature or slightly below for as short a time as practicable;

(b) The cooked soybeans are ground while bringing them into contact with sodium bicarbonate aqueous solution at a temperature above 80° C.;

(c) Water soluble components are extracted from the ground soybeans to the aqueous medium; and (d) A substantial proportion of the solids is removed from the slurry.

Any variety of soybean can be used in practicing this invention and they can be used whole or dehulled, naturally dried or unsoaked. Soybeans can be also used as dehulled and sub-divided cotyledons.

In the first step, unsoaked soybeans are cooked in a hot or boiling aqueous medium. The aqueous mediums useful in this invention include water such as tap water or other drinking water or an aqueous solution of an alkali such as sodium bicarbonate, sodium hydroxide or potassium hydroxide. The concentration of alkali solution that may be used in this invention falls within a broad range, but the preferred concentration is up to about 1% by weight. It is preferable that the cooking time be as short as practicable in order to recover the maximum amount of water-soluble substance to be extracted in the subsequent step. In general, the cooking is carried out in the aqueous medium at boiling temperature or slightly below for a period from 2 to 5 minutes. Said "boiling temperature or slightly below" means a temperature ranging from the boiling temperature of the medium used to about 5° C. below the boiling temperature. If the cooking is effected at the boiling temperature or very close to the boiling temperature, 2-4 minutes of cooking suffice.

If a shorter time but within the time defined above is used for the cooking, the deactivation of lipoxidase will not be completed. As previously explained, it has been believed that the presence of lipoxidase, during the grinding step, causes certain enzymatic reactions to form undesirable odor. However, although lipoxidase is not completely deactivated during the first step, the formation of undesirable odor can be completely avoided if the cooked soybeans are ground while bringing them into contact with an aqueous medium at a temperature above 80° C. This is believed to be because lipoxidase released from the ground soybeans is deactivated by contact with hot medium before the undesirable reactions take place.

If the cooking is effected for a period of time up to 2 minutes, lipoxidase will not be completely deactivated even in the grinding step. In contrast, if the boiling time is longer than 5 minutes, water-soluble components, particularly, water-soluble protein will be significantly insolubilized thereby remarkably reducing the total nutrient content of the product.

After completion of the cooking step, the weight of the cooked soybeans is 1.3-1.5 times that of the starting soybeans; namely, this corresponds to a moisture content of from 32 to 42% by weight based on the uncooked soybeans. The cooked soybeans are much harder than soybeans having a moisture content about 60% by weight obtained by the conventional soaking.

The second step is carried out for the purpose of grinding the cooked soybeans and simultaneously removing bitterness from the soybeans. The cooked soybeans are ground in the presence of a 0.1-1% by weight sodium bicarbonate aqueous solution. The temperature of the solution should be between from above 80° C. up to the boiling point. The continuous grinding is conveniently done by pouring the solution on the cooked soybeans as they are being ground. In case a sodium bicarbonate aqueous solution is used in the first step, the solution recovered may be used for the grinding step instead of fresh solution. Recovery and use of the solution from the first step eliminates the problem of disposing of the waste solution and, accordingly, no pollution problem arises.

When the second step is carried out by the use of tap water or other drinking water, all the bitterness of the slurry can not be removed, whereas, if sodium bicarbonate solution is used, bitterness can be completely removed from the obtained slurry.

The third step is effected to extract protein and water-soluble components from the ground soybeans. The extraction may be carried out by any conventional way, i.e. by allowing the slurry to stand with or without heating for a proper period of time. The extraction may be conveniently carried out without further heating the slurry, but preventing the slurry from drastically cooling. Alternatively, the extraction can be effected by heating the slurry with a plate-type heater to a temperature above 70° C. and keeping the slurry at that temperature for about 5 minutes or by heating the slurry in a tank until the temperature reaches above 70° C.

The fourth step or final step is to separate the solids from the slurry to obtain soybean milk. The step is carried out by any conventional means for separation of solids from slurry, for example, by a filter press, a decanter, a centrifugal separator, a shaking screen or the like. The thus produced, refined soybean milk does not feel rough to the tongue, and has no undesirable beany flavour or bitterness.

This invention is further illustrated by the following Experiments and Examples.

EXPERIMENT 1

Purpose

The purpose of this experiment is to confirm that the degree of insolubilization of protein in soybeans depends upon the cooking time.

Procedure

Dehulled and unsoaked dry soybeans were cooked in water at boiling temperature for a predetermined period of time. After boiling, the soybeans were ground in cold water to form an aqueous dispersion containing 10% by weight of ground soybeans. Then the urease activity of the dispersion was measured and from this the nitrogen soluble index (NSI) was calculated. NSI is defined by the following equation, $$NSI = \frac{\text{amount of water soluble protein in soybean}}{\text{amount of total protein in soybean}} \times 100$$

The method for determination of urease activity is explained in the preprint for a report entitled "Alternative process for full-fat soy flours for use in developing countries" by Mr. G. C. Mustakas in the International Conference on Soybean Foods, Peoria, Ill., U.S.A. in 1966.

Results

| Boiling Time(min.) | Urease activity as percent the initial activity | NSI (% reduction) |
|---|---|---|
| not cooked | 100 | 88 (100) |
| 1 | 96 | 75 (85.2) |
| 2 | 87 | 64 (72.7) |

| Boiling Time(min.) | Urease activity as percent the initial activity | NSI (% reduction) |
|---|---|---|
| 3 | 80 | 51 (58.0) |
| 5 | 50 | 38 (43.2) |
| 10 | 22 | 24 (27.3) |

As is shown in the results, the amount of water-soluble protein is reduced to a minimum of 27.3% by weight based on that of the initial soluble protein, depending on the length of boiling time.

EXPERIMENT 2

Purpose

It is known that the inherent beany flavor of soybean can be removed by cooking soybeans prior to grinding. In this experiment, the relationship between cooking time of soybean and the degree of removal of beany flavor is observed.

Procedure

Unsoaked and dehulled dry soybeans were cooked in water at boiling temperature for a predetermined period of time. The boiled soybeans were then ground while bringing them in contact with 0.1% sodium bicarbonate aqueous solution at an ambient temperature or at 80° C. to obtain an aqueous dispersion containing 10% by weight of ground soybeans. The content of n-hexanol in each of the dispersions was determined.

Results

The results are shown in the Table below.

Incidentally, it is well known in the art that beany flavor is mainly derived from n-hexanol and that a concentration higher than several ppb gives organolepticly detectable beany flavor.

Table

| Boiling Time (min.) | Concentration of n-hexanol (ppb) | | Beany flavor by organoteptic test | |
|---|---|---|---|---|
| | grinding at ambient temp. | grinding at 80° C. | grinding at ambient temp. | grinding at 80° C. |
| not cooked | 92 | 42 | yes | yes |
| 1 | 41 | 20 | yes | yes |
| 2 | 29 | 6 | yes | no |
| 3 | 13 | 6 | yes | no |
| 5 | 6 | 5 | no | no |
| 10 | 3 | 3 | no | no |

As is shown in the table above, boiling for 2 minutes or longer and grinding at an elevated temperature, or boiling for 5 minutes or longer and grinding at an ambient temperature removes undesirable beany flavor from an aqueous dispersion of ground soybeans.

EXAMPLE 1

Dehulled and unsoaked soybeans (2.5 Kg) were added to a boiling 1% by weight sodium bicarbonate aqueous solution (20 l) and boiled for 4 minutes. The boiled soybeans which weighed 3.5 Kg were ground while adding a fresh 0.1% sodium bicarbonate aqueous solution at 90° C. to obtain 20 Kg of soybean slurry. The slurry was kept at that temperature and passed through a 200 mesh shaking screen to remove solid residue to obtain 12 Kg of soybean milk with a total solid content of 9.5% by weight and a ph of 7.4.

EXAMPLE 2

Dehulled and unsoaked soybeans (2.5 Kg) were added to a 0.5% sodium bicarbonate aqueous solution (20 l) at 80° C. and the solution was rapidly heated. The soybeans were boiled for 3 minutes at the boiling temperature. The boiled soybeans were then treated in a manner similar to that of Example 1 to obtain 12 Kg of soybean milk which had no beany flavour or bitterness and a total solid content of 9% by weight and a pH of 7.4.

EXAMPLE 3

Example 1 was repeated except that the solution after the boiling of soybeans was used in grinding instead of a fresh 0.1% sodium bicarbonate aqueous solution to obtain 12 Kg of soybean milk having a total solid content of 10% by weight and a pH of 7.4. The soybean milk was colored slightly stronger than the products obtained according to Example 1 or 2, but had no beany flavour or bitterness.

EXAMPLE 4

Dehulled and unsoaked soybeans (2.5 Kg) were treated in a manner similar to that of Example 1 except a different amount of the solution was used in grinding to obtain soybean milk. The relation between the amount of the solution and the characteristics of the product are shown in the following Table. In every case, the soybean milk obtained had no beany flavor or bitterness.

Table

| Slurry Weight | Soybean Milk Weight | Solid Content of Milk | Beany Flavor | Bitterness |
|---|---|---|---|---|
| 15 (Kg) | 6.5 (Kg) | 11.5 (%) | None | None |
| 20 | 12 | 9.5 | None | None |
| 25 | 18 | 7.3 | None | None |
| 30 | 24 | 5.3 | None | None |

As shown in the Table, each batch of soybean milk produced according to this invention had no beany flavor or bitterness. The soybean milk may be consumed as a soybean beverage as it is or its flavor or taste may be enhanced or changed by the addition of proper amounts of one or more additives such as sugar, edible acid, sodium chloride, flavour and fragrance.

As illustrated hereinbefore, this invention provides a much simpler process for producing soybean milk with none of the beany flavor or bitterness inherent in the prior art processes. Furthermore, if the solution from the cooking of soybeans is recovered and used during the grinding, the product can be prepared without any waste of fluid.

What is claimed is:

1. A process for producing soybean milk with no undesirable beany flavor or bitterness which comprises cooking unsoaked soybeans in an aqueous medium at boiling temperature for 2-4 minutes, grinding the cooked soybeans while bringing them into contact with an about 0.1-1% sodium bicarbonate aqueous solution at a temperature above 80° C., extracting protein and water soluble components from the ground soybeans and removing substantially all of the solids from the slurry to obtain soybean milk.

2. A process in accordance with claim 1 wherein said aqueous medium for cooking is an about 0.1-1% sodium bicarbonate aqueous solution.

* * * * *